3,035,008
NEW GRAFT COPOLYMERS CONTAINING THE NORBORNENE NUCLEUS, METHOD OF PREPARATION, AND COATING COMPOSITIONS CONTAINING SAME
Norman G. Gaylord, Westbury, N.Y., assignor to Interchemical Corporation, New York, N.Y., a corporation of Ohio
No Drawing. Filed June 17, 1959, Ser. No. 820,866
18 Claims. (Cl. 260—45.2)

This invention relates to new and useful polymeric materials made by addition polymerization and to coating compositions containing these new polymeric materials. More particularly, it relates to new graft copolymers in which acrylic copolymers containing the norbornene nucleus have been incorporated with addition polymers by graft polymerization. These new graft copolymers, which are more fully defined below, have excellent pigment wetting and dispersing properties, are compatible with a number of different surface coating resins, can be prepared in relatively concentrated solutions and are of great utility in the compounding of finished surface coatings of the heat curing type.

Certain of these new graft copolymers may be combined with thermosetting amine-aldehyde resins to yield heat-curable surface coatings which adhere well to metal surfaces, are tough and homogeneous, are hard and scratch resistant, exhibit excellent resistance to the attack of alkalies, soaps, and detergents, are flexible, and are remarkably stable to discoloration, even when subjected to heating at considerably higher temperatures or for longer periods than is necessary for full cure (overbake). In addition these coatings exhibit a remarkably high gloss even on overbake.

For a number of years it has been known that extremely hard thermosetting resins that are stain and scratch resistant can be made by reaction of an aldehyde (preferably formaldehyde) with a polyfunctional amide, such as urea, biuret, dicyandiamide, and (especially) triazines such as ammeline, melamine, substituted melamines, benzoguanamine, etc. The resulting resins may be prepared in aqueous solutions or in lower alcohols, in which case they are hydrophilic, or they may be produced in the presence of higher alcohols, such as butyl, in which case they are hydrophobic and may be used as a solution in a mixture of higher alcohols (e.g. butyl or higher) and aromatic hydrocarbons (e.g. xylene or toluene). These resins are available commercially under trade names such as Uformite, Resimene, Aerotex, Melmac, etc.

These "amine-aldehyde" resins have proven very valuable in a number of applications. Used by themselves they are excellent for certain molding uses, but without extensive modification they are unsatisfactory for most surface coating applications due to their poor adhesion to many metal surfaces and to their very slight flexibility. This is unfortunate because their low cost, extraordinary hardness and good alkali and detergent resistance all represent properties much sought after for many surface coating applications.

It has now been discovered that when these amine-aldehyde resins are combined with a new graft copolymer of this invention, the resulting blend provides a heat curable surface coating which overcomes, to a large extent, the above mentioned deficiencies of amine-aldehyde coatings while maintaining the many excellent properties of such coatings.

Copending application Serial Number 768,839 filed October 22, 1958, now U.S. Patent No. 2,985,611, discloses an acrylic type copolymer which when blended with amine-aldehyde resins overcomes to a great extent the deficiencies existing in surface coatings using amine-aldehyde resins.

This invention provides novel graft copolymers produced by grafting side chains of the copolymer disclosed in the above mentioned application on to preformed addition copolymers, particularly copolymers containing styrene and vinyl toluene monomers. These new graft copolymers when blended with amine-aldehyde resins effectively overcome the deficiencies of previous coatings of such resins. In fact, these new graft copolymers maintain the many desirable properties of the acrylic type copolymers described in copending application Serial Number 768,839, but are less expensive to produce than are such acrylic copolymers.

The term "graft copolymers" as used in this specification should be defined here and distinguished from ordinary copolymers. The term "copolymers" as used in this specification covers the reaction products obtained by the addition polymerization of a mixture of two or more ethylenically unsaturated, monomeric compounds. The resultant copolymers contain polymerized monomeric groupings of the monomers present distributed within the molecule in a regular or random manner.

In contrast, "graft copolymers" cover polymeric products obtained by addition polymerization of a mixture of two or more monomers in the presence of a preformed polymer, in such a manner that the monomeric units copolymerize to form attached, or grafted, side chains, or branches, on the preformed polymer. The important structural characteristic of graft copolymers is that the composition of monomers constituting the backbone may be different from those constituting the branches.

The novel graft copolymers of this invention are prepared by bulk or solution addition polymerization of a mixture of monomers comprising 5% to 30% by weight of a non-allylic alcohol containing the norbornene nucleus, 60 to 95% by weight of at least one acrylic type ester having the formula

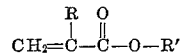

where R is a member selected from the group consisting of hydrogen, the methyl group and the ethyl group and R' is an alkyl radical containing from 1 to 8 carbon atoms and 0 to 35% by weight of methacrylic acid in the presence of a preformed polymer comprising a vinyl type monomer, particularly styrene or vinyl toluene and at least one structural unit having the formula

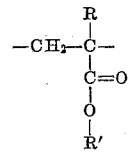

where R and R' have the meaning given above.

Without absolute commitment on the theory involved, it is believed that, by means of chain transfer mechanism, centers are activated along the main preformed copolymer backbone. This results in the relocation of the free radical source at these centers and the consequent generation of branch copolymers by the polymerization of the monomers capable of being polymerized by a free radical mechanism from these centers.

While for the purposes of illustrating this invention, we have primarily used butyl acrylate and methyl methacrylate for our acrylic ester components, we do not intend to limit the practice of our invention, to these two components. It will be obvious to those skilled in the art that related acrylic ester homologs of the class described above and having alkyl radicals of 1 to 8 carbon atoms may readily be used.

With respect to the non-allylic alcohols containing the norbornene nucleus, it should be noted that norbornene has the formula

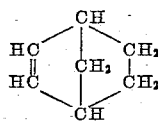

Norbornene nucleus while for purposes of describing this present invention, reference is made to copolymers of 2-hydroxymethyl-5-norbornene which has the following structure:

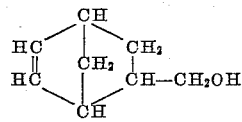

2-hydroxymethyl-s-norbornene

It will be understood that related homologs may readily be used and it is intended that the appended claims cover the use of such compounds. 2-hydroxymethyl-5-norbornene is readily prepared by condensing allyl alcohol with cyclopentadiene (U.S. Patents No. 2,596,279 and No. 2,353,606). Alkyl substituted cyclopentadienes behave similarly to yield corresponding substituted derivatives. Likewise compounds containing two alcoholic hydroxyl groups can be obtained by condensing an unsaturated diol, such as butendiol with cyclopentadiene.

In the practice of this invention, both the copolymerization of preformed or backbone copolymer and the copolymerization of the graft copolymer are initiated by catalysts or polymerization initiators of the free radical type. The most commonly used initiators are azo compounds and organic peroxygen compounds. Typical of the azo compounds that may be used for this purpose are azobisisobutyronitrile and azovisisovaleronitrile. Typical of the organic peroxygen compounds that may be advantageously used as copolymerization initiators are such compounds as peracetic acid, acetyl peroxide, perbenzoic acid, benzoyl peroxide, lauroyl peroxide, stearoyl peroxide, ditertiary butyl peroxide and tertiary butyl peroxide.

In the preparation of the graft copolymer it should be remembered that the non-allylic alcohols containing the norbornene nucleus tend to be somewhat less reactive under copolymerization conditions than typical acrylic monomers such as acrylic acid, methacrylic acid, their alkyl esters, etc. Accordingly, if they are mixed initially with all of the other polymerizable monomers with which they are to be polymerized, the tendency is for the most reactive monomers to polymerize or copolymerize by themselves at first, with the norbornene alcohol remaining essentially unreacted until the supply of more reactive molecules is substantially exhausted. Such conditions do not favor efficient and uniform incorporation of these less-reactive monomers into a graft copolymer. It has been found that efficient and relatively uniform incorporation of norbornene alcohols into acrylate copolymer side chains occurs when the acrylate and other highly reactive monomers are added slowly (with a catalyst or reaction initiator) to the norbornene alcohol in the presence of the preformed backbone copolymer. Accordingly most of the examples which follow will illustrate this technique.

As solvents both in the preparation of the preformed copolymer and the graft copolymer, it is preferred to use xylene or toluene although benzene, ethyl benzene and petroleum naphthas may also be used.

Among the vinyl type unsaturated monomers in addition to vinyl toluene and styrene which may be included in the preformed copolymer of this invention, are acids such as acrylic and methacrylic; nitriles such as methacrylonitrile and acrylonitrile; esters of unsaturated dibasic acids, such as dimethyl maleate and dibutyl fumarate; amides, such as acrylamide, methacrylamide, methylolacrylamide, and methylol-methacrylamide; hydroxy compounds such as ethylene glycol monoacrylate or monomethacrylate, glycerol monoacrylate or monomethacrylate or glycerol allyl ether; and vinyl alkyl ethers such as vinyl butyl ether, vinyl ether, vinyl hexyl ether, etc.

The graft copolymers of this invention display excellent pigment-wetting power which facilitates the dispersion of pigments such as carbon black, titanium oxide, phthalocyanines, etc. in vehicles containing these copolymers.

While Uformite MX-61 (a butylated triazine formaldehyde resin marketed by Rohm & Haas) has been used to illustrate the amine-aldehyde resins in the example, it will be obvious to those skilled in the art that other amine-aldehyde resins may readily be substituted therefor. These include urea, biuret, dicyandiamide and (particularly) triazines such as ammeline, melamine, substituted melamines and benzoguanamine.

In blending the novel graft copolymers of this invention with amine-aldehyde resins, the ratios are not critical. However, for best results ratios of from 6 to 7 parts by weight on a solids basis graft copolymer to 3 to 4 parts of amine-aldehyde resin are recommended.

The following examples will illustrate the practice of this invention.

*Example 1*

Part A.—A solution of 90 g. of styrene, 14 g. of methyl methacrylate, 52 g. of benzoyl peroxide and 114 g. of xylene is added dropwise over a period of 1 hour to 300 g. of xylene at 90° C. The temperature is maintained at 90° C. for one additional hour. A solids determination indicates a 100% conversion of monomers to copolymer. (The solids content is 20.4% solids by weight.)

Part B.—54 g. of 2-hydroxymethyl-5-norbornene is added to 254 g. of the copolymer solution produced in Part A. A solution of 220 g. of butyl acrylate, 13 g. of methyl methacrylate, 13 g. of methacrylic acid, 6 g. of benzoyl peroxide and 150 g. of xylene is then added to the reaction mixture dropwise over a period of 1½ hours while the mixture is maintained at 90° C. The temperature is maintained at 90° C. for an additional 1½ hours after which, 1.5 g. of benzoyl peroxide is added and the mixture is maintained at 90° C. for another 1½ hours. The mixture is then heated to 125° C. and maintained at that temperature for 1 hour to destroy the residual catalyst. The final reaction product is water white, has a solids content of 43.2% by weight and viscosity of E-F on the Gardner-Holdt scale. The graft copolymer produced is highly compatible with amine-formaldehyde resins and when blended in solution with a butylated triazine formaldehyde resin such as the commercial product Uformite MX-61 in a weight ratio (solids basis) of six parts of graft copolymer to 4.8 parts of triazine resin, drawn down on a glass or steel panel and baked at 177° C. for 30 minutes, the resultant clear film is well cured, hard, flexible, has a very high gloss and exhibits excellent resistance to soaps, solvents, and detergents.

*Example 2*

Part A.—A solution of 220 g. of butyl acrylate, 13 g. of methyl methacrylate, 13 g. of methacrylic acid, 6 g. of benzoyl peroxide and 150 g. of xylene is added dropwise over a 2 hour period to 54 g. of 2-hydroxymethyl-5-norbornene and 150 g. xylene at 90° C. Heating is continued overnight for a period of 17 hours. An additional 1.5 g. of benzoyl peroxide is added and the solution is heated for an additional 5 hours, at 90° C. A solids determination indicates a 45.1% solids content by weight.

Part B.—23.6 g. of polymer solution prepared in Part A are blended with 10 g. of the polymer solution prepared in Example 1, Part A. The resulting blend contains the two uncombined polymers in substantially the same weight ratios in which these two polymers are incorporated in the graft copolymers produced in Example 1, Part B. The blend is cloudy which indicates incompatibility of the two polymers. This blend is baked on metal panels for 30 minutes at 177° C. A cloudy coating results. This indicates incompatibility. This blend is now mixed with Uformite MX-61 (butylated triazine formaldehyde resin, produced by Rohm & Haas Inc.) in a weight ratio (solids basis) of six parts of blend, to 4.8 parts of triazine resin, drawn down on a glass or a steel panel and baked at 177° C. for 30 minutes. The result is a poorly cured, cloudy coating which indicates incompatibility of the two mixed polymers with amine-formaldehyde resins.

*Example 3*

A solution of 150 g. of styrene, 360 g. of butyl acrylate, 90 g. of methyl methacrylate, 6 g. of benzoyl peroxide and 300 g. of xylene is added dropwise over a period of 1½ hours to 300 g. of xylene maintained at 90° C. Then, during the next 1½ hours, a solution of 440 g. of butyl acrylate, 26 g. of methyl methacrylate, 26 g. of methacrylic acid, 108 g. of 2-hydroxymethyl-5-norbornene, 6 g. of benzoyl peroxide and 600 g. of xylene is added dropwise to the reaction mixture which continues to be maintained at 90° C. The mixture is then maintained at 90° C. for an additional 1½ hours at which time, 1.5 g. of benzoyl peroxide are added and the mixture is maintained at 90° C. for an additional 1 hour, making a total of 5½ hours at 90° C. The mixture is then heated at 125° C. for 1 hour to destroy the residual catalyst. The final product has solids content of 45.8% by weight which indicates a 91.6% conversion of monomers to graft copolymer.

The viscosity is H on the Gardner-Holdt scale.

The solution of the graft copolymer is then blended with Uformite MX-61 and a baked coating is prepared from such blend in accordance with the procedure described in Example 1. The resulting coating is well cured, hard, flexible, has a very high gloss, and exhibits an excellent resistance to soaps, solvents and detergents.

*Example 4*

A solution of 150 g. of styrene, 364 g. of butyl acrylate, 60 g. of methyl methacrylate, 26 g. of methacrylic acid, 6 g. of benzoyl peroxide and 300 g. of xylene is added dropwise over a period of 1½ hours to 300 g. of xylene maintained at 90° C. Then during the next 1½ hours, a solution of 440 g. of butyl acrylate, 26 g. of methyl methacrylate, 26 g. of methacrylic acid, 108 g. of 2-hydroxymethyl-5-norbornene, 6 g. of benzoyl peroxide and 600 g. of xylene is added dropwise to the reaction mixture which continues to be maintained at 90° C. The mixture is then maintained at 90° C. for an additional 1½ hours at which time 1.5 g. of benzoyl peroxide is added and the mixture is maintained at 90° C. for an additional 1 hour making a total of 5½ hours at 90° C. The mixture is then heated at 125° C. for 1 hour to destroy the residual catalyst. The final product has a solids content of 46.4% by weight which indicates a 91.6% conversion of monomer to graft copolymer. The viscosity at 25° C. is 0 on the Gardner-Holdt scale. A blend of the resulting graft polymer solution with Uformite MX-61 provides, upon the baking thereof in accordance with the procedure set forth in Example 1, a coating displaying substantially the same excellent properties shown by the coatings prepared in Example 1.

*Example 5*

A solution of 180 g. of styrene, 28 g. of methyl methacrylate, 104 g. of xylene and 2.08 g. of benzoyl peroxide is added dropwise over a period of one hour to 104 g. of xylene maintained at 90° C. The mixture is maintained at 90° C. for an additional hour at which time 2.08 g. of benzoyl peroxide are added. The mixture is continued at 90° C. for another 3 hours making a total of 5 hours' reaction time. The final product has a solids content of 42.3% by weight which indicates an 84.6% conversion of monomers to copolymer.

*Example 6*

|   | G. |
|---|---|
| A. Butyl acrylate | 231 |
| B. Methyl methacrylate | 24 |
| C. Xylene | 150 |
| D. Benzoyl peroxide | 6 |
| E. Resin solution of Example 5 | 104 |
| F. 2-hydroxymethyl-5-norbornene | 45 |
| G. Xylene | 150 |
| H. Benzoyl peroxide | 1.5 |

A solution of A, B, C, and D is added dropwise over a period of 90 minutes to a solution of E, F and G at 90° C. The mixture is maintained at 90° C. for 90 minutes at which time H is added and then at 125° C. for 1 hour. The reaction product is slightly yellow and has a solids content of 44.5% by weight indicating an 89% conversion of monomers to graft copolymer. The resin when blended with aminealdehyde resins yields excellent baking enamels.

*Example 7*

|   | G. |
|---|---|
| A. Butyl acrylate | 135 |
| B. Ethyl acrylate | 105 |
| C. Methacrylic acid | 15 |
| D. Xylene | 105 |
| E. Benzoyl peroxide | 6 |
| F. Resin solution of Example 5 | 104 |
| G. 2-hydroxymethyl-5-norbornene | 45 |
| H. Xylene | 150 |
| I. Benzoyl peroxide | 1.5 |

A solution of A, B, C, D and E is added dropwise over a period of 90 minutes to a solution of F, G, and H at 90° C. The procedure of Example 6 is then repeated.

The final product is a slightly viscous resin solution with a solids content of 46.0% indicating a 92% conversion to graft copolymer.

The solution is then blended with Uformite MX-61 and a baked coating is prepared from such blend in accordance with the procedure described in Example 1. The resulting coating has properties comparable with those of Example 1 except that it is less flexible.

*Example 8*

|   | G. |
|---|---|
| A. Butyl methacrylate | 150 |
| B. Ethyl acrylate | 90 |
| C. Methacrylic acid | 15 |
| D. Xylene | 150 |
| E. Benzoyl peroxide | 6 |
| F. Resin solution of Example 5 | 104 |
| G. 2-hydroxymethyl-5-norbornene | 45 |
| H. Xylene | 150 |
| I. Benzoyl peroxide | 1.5 |

The procedure of Examples 6 and 7 is repeated.

The final product is a slightly viscous resin solution with a solids content of 42.6% indicating an 85.2% conversion to graft copolymer.

When the product is blended with Uformite MX-61 and baked in accordance with the procedure described in Example 1, a good baked coating is produced.

*Example 9*

A solution of 42.7 grams of vinyl toluene, 6.7 grams methyl methacrylate, 2.6 grams methacrylic acid, 52 grams xylene, 0.52 gram benzoyl peroxide is added dropwise over a period of 1 hour to a solution of 150 grams of xylene at 90° C. The mixture is maintained at 90° C. for an additional hour at which time 0.52 gram of benzoyl peroxide is added. The mixture is maintained at 90° C. for an additional 2.5 hours when 0.52 gram benzoyl peroxide is added and the reaction temperature is maintained at 90° C. for four hours, making a total of 9.5 hours at 90° C. The reaction product has a solids content of 16.6% indicating conversion of 81% of monomers to copolymer.

To the reaction product, there is added 54 grams of 2-hydroxymethyl-5-norbornene. The mixture is heated to 90° C., and solution of 220 grams of butyl acrylate, 13 grams methyl methacrylate, 13 grams methacrylic acid, 150 grams xylene, and 6 grams benzoyl peroxide is added over a period of 90 minutes, maintaining the temperature at 90° C. The reaction is slightly exothermic and during the addition, intermittent cooling may be necessary. The mixture is maintained at 90° C. for an additional 1.5 hours at which time, 1.5 grams of benzoyl peroxide are added. The temperature is maintained at 90° C. for another 1.5 hours and then the temperature is raised to 125° C. for 1 hour, making a total of 4.5 hours at 90° C. and 1 hour at 125° C. The product is a resinous yellow solution having a solids content of 45.5% by weight indicating a conversion of 91.0%.

The solution is then blended with Uformite MX-61 and a baked coating is prepared from such blend in accordance with the procedure described in Example 1. The resulting coating has properties comparable with those of Example 1 except that it is less flexible.

While there have been described what are, at present, considered to be the preferred embodiments of this invention, it will be obvious to those skilled in the art that various changes and modifications may be made therein without departing from the invention, and it is, therefore, intended to cover all such modifications as fall within the true spirit and scope of the invention.

What is claimed is:

1. A novel graft copolymer comprising the addition polymerization products of (A) a mixture of monomers including 5% to 30% by weight of a non-allylic alcohol containing the norbornene nucleus, and 70% to 95% by weight of at least one acrylic type ester having the formula

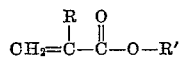

where R is a member selected from the group consisting of hydrogen, the methyl group and the ethyl group, and R' is an alkyl radical containing 1 to 8 carbon atoms, and (B) a preformed addition copolymer formed by the copolymerization of a member of the group consisting of vinyl toluene and styrene with at least one acrylic monomer having the formula

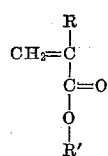

where R and R' have the meaning given above.

2. The novel graft copolymer defined in claim 1, wherein said mixture of monomers further includes up to 35% by weight of methacrylic acid.

3. A graft copolymer according to claim 2, wherein said mixture of monomers includes 2-hydroxymethyl-5-norbornene, butyl acrylate, methyl methacrylate, and methacrylic acid.

4. A graft copolymer according to claim 2, wherein said mixture of monomers includes 2-hydroxymethyl-5-norbornene, butyl acrylate, ethyl acrylate and methacrylic acid.

5. A graft copolymer according to claim 2 wherein said preformed addition copolymer includes styrene and methyl methacrylate.

6. The novel graft copolymer defined in claim 1, wherein said preformed addition copolymer further includes methacrylic acid.

7. A graft copolymer according to claim 6, wherein said preformed addition copolymer includes vinyl toluene, methyl methacrylate and methacrylic acid.

8. A graft copolymer according to claim 1, wherein said mixture of monomers includes 2-hydroxymethyl-5-norbornene, butyl acrylate and methyl methacrylate.

9. A heat curable surface coating composition comprising a volatile organic solvent solution of a graft copolymer as defined in claim 1 and an organic solvent soluble amine-aldehyde resin of the class consisting of triazine-formaldehyde resins and urea-formaldehyde resins.

10. A heat curable surface coating composition comprising a volatile organic solvent solution of graft copolymer as defined in claim 2 and an organic solvent soluble amine-aldehyde resin of the class consisting of triazine-formaldehyde resins and urea-formaldehyde resins.

11. A heat curable surface coating composition comprising a volatile organic solvent solution of graft copolymer as defined in claim 3 and an organic solvent soluble amine-aldehyde resin of the class consisting of triazine-formaldehyde resins and urea-formaldehyde resins.

12. A heat curable surface coating composition comprising a volatile organic solvent solution of graft copolymer as defined in claim 4 and an organic solvent soluble amine-aldehyde resin of the class consisting of triazine-formaldehyde resins and urea-formaldehyde resins.

13. A heat curable surface coating composition comprising a volatile organic solvent solution of graft copolymer as defined in claim 5 and an organic solvent soluble amine-aldehyde resin of the class consisting of triazine-formaldehyde resins and urea-formaldehyde resins.

14. A heat curable surface coating composition comprising a volatile organic solvent solution of graft copolymer as defined in claim 6 and an organic solvent soluble amine-aldehyde resin of the class consisting of triazine-formaldehyde resins and urea-formaldehyde resins.

15. A heat curable surface coating composition comprising a volatile organic solvent solution of graft copolymer as defined in claim 7 and an organic solvent soluble amine-aldehyde resin of the class consisting of triazine-formaldehyde resins and urea-formaldehyde resins.

16. A heat curable surface coating composition comprising a volatile organic solvent solution of a graft copolymer as defined in claim 8 and an organic solvent soluble amine-aldehyde resin of the class consisting of triazine-formaldehyde resins and urea-formaldehyde resins.

17. A method of preparing novel graft copolymers which comprises the addition polymerization by heating of a mixture of monomers including 5% to 30% by weight of a non-allylic alcohol containing the norbornene nucleus, and 70% to 95% by weight of at least one acrylic type ester having the formula

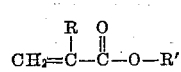

where R is a member selected from the group consisting of hydrogen, the methyl group and the ethyl group and R' is an alkyl radical containing 1 to 8 carbon atoms in the presence of an addition polymerization initiator and a preformed addition copolymer formed by the copolymerization of a member of the group consisting of vinyl toluene and styrene with at least one acrylic monomer having the formula
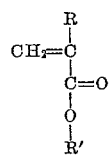
where R and R' have the meaning given above.
18. The method claimed in claim 17, wherein said mixture of monomers further includes up to 35% by weight of methacrylic acid.
References Cited in the file of this patent
UNITED STATES PATENTS
| | | |
|---|---|---|
| 2,596,279 | Nichols et al. | May 13, 1952 |
| 2,853,463 | Gaylord | Sept. 23, 1958 |
| 2,873,263 | Lal | Feb. 10, 1959 |